United States Patent
Pepitone et al.

(10) Patent No.: US 7,623,044 B2
(45) Date of Patent: Nov. 24, 2009

(54) RUNWAY AND TAXIWAY TURNING GUIDANCE

(75) Inventors: David Pepitone, Sun City, AZ (US); Gang He, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 383 days.

(21) Appl. No.: 11/606,546

(22) Filed: Nov. 30, 2006

(65) Prior Publication Data

US 2007/0241935 A1    Oct. 18, 2007

Related U.S. Application Data

(63) Continuation-in-part of application No. 11/399,240, filed on Apr. 6, 2006.

(51) Int. Cl.
*G08G 5/00* (2006.01)
(52) U.S. Cl. ............... 340/950; 340/945; 340/972; 340/979; 701/201; 701/208; 701/211
(58) Field of Classification Search .......... 340/971, 340/972, 979, 945, 947, 948, 950, 954; 701/3, 701/201, 208, 211, 213
See application file for complete search history.

(56) References Cited

U.S. PATENT DOCUMENTS

| 6,282,466 | B1 * | 8/2001 | Nolte et al. ............... 701/11 |
| 6,571,166 | B1 | 5/2003 | Johnson et al. |
| 7,043,342 | B1 * | 5/2006 | Dewees .................... 701/1 |
| 7,382,284 | B1 * | 6/2008 | Armstrong et al. ......... 340/958 |
| 2004/0059497 | A1 | 3/2004 | Sankrithi | |

FOREIGN PATENT DOCUMENTS

EP    0980828 A1    2/2000
EP    1842772 A2    10/2007

OTHER PUBLICATIONS

EP Search Report dated Aug. 14, 2009, EP 07121831.7-2215.

* cited by examiner

*Primary Examiner*—Daniel Wu
*Assistant Examiner*—Hongmin Fan
(74) *Attorney, Agent, or Firm*—Ingrassia Fisher & Lorenz, P.C.

(57) ABSTRACT

According to an example embodiment, a method includes receiving data about an aircraft that is moving on a surface using at least a first wheel, the data descriptive of physical characteristics of the aircraft, calculating a first path of the first wheel along the surface using the data, and displaying the first path in relation to a boundary between a first area of the surface and a second area of the surface, the first area safe for the aircraft, the second area unsafe for the aircraft.

7 Claims, 11 Drawing Sheets

US 7,623,044 B2

RUNWAY AND TAXIWAY TURNING GUIDANCE

CROSS REFERENCE TO RELATED APPLICATIONS

This application is a continuation-in-part of U.S. application Ser. No. 11/399,240, entitled RUNWAY AND TAXIWAY TURNING GUIDANCE, which was filed on 6 Apr. 2006. U.S. application Ser. No. 11/399,240 is incorporated by reference in its entirety.

FIELD

This disclosure relates generally to aircraft navigation, and more particularly, to navigation indicators that give runway and taxiway turning guidance.

BACKGROUND

As air travel increases, both in the number of flights and in the number of destinations, it becomes more likely that a pilot will have to land an aircraft on an unimproved airstrip or runway. Some of these unimproved airstrips are so narrow that the pilot may have difficulty positioning the aircraft for takeoff or for returning to a terminal or other destination point after landing. This is especially true for larger aircraft.

In some cases, the pilot may be forced to make a 180° turn. For example, the pilot may have to taxi to an end of a runway, then execute the 180° turn for takeoff in the opposite direction. However, this maneuver may cause the landing gear (nose gear, main gear, or both) to become stuck off the runway, which may completely shut down an airport until the aircraft can be cleared.

Airplanes have also become stuck off the runway or taxiway at modern airports as well. For example, if an aircraft misses a taxiway turn centerline, the landing gear may get stuck in the grass or mud adjacent to the taxiway. Delays caused by clearing the aircraft may be even more significant at modern airports. Travelers may become frustrated due to the delays and airlines are likely to lose money.

To avoid the problems that occur when an airplane's landing gear gets stuck, some aircraft manufacturers have installed video cameras that allow the pilot to see the landing gear. For example, video cameras have been installed in the Boeing 777 and the Airbus A380 aircraft. Unfortunately, even with the video cameras, pilots may have difficulty with direct visualization due to human factors issues associated with depth perception and off angle viewing. Additionally, ambient conditions, such as lack of light at night and during storms, can make direct visualization difficult with the use of video cameras.

Thus, it would be beneficial to provide the pilot with turning guidance in a manner that the pilot can easily visualize the aircraft's landing gear in relationship to the runway or taxiway edge.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

The following detailed description of example embodiments is not intended to limit the invention or the application and uses of the invention. Furthermore, there is no intention to be bound by any expressed or implied theory presented in the preceding technical field, background, or the following detailed description of example embodiments. Furthermore, other desirable features and characteristics of the invention will become apparent from the subsequent detailed description and the appended claims, taken in conjunction with the accompanying drawings and the foregoing technical field and background.

Figure 1:
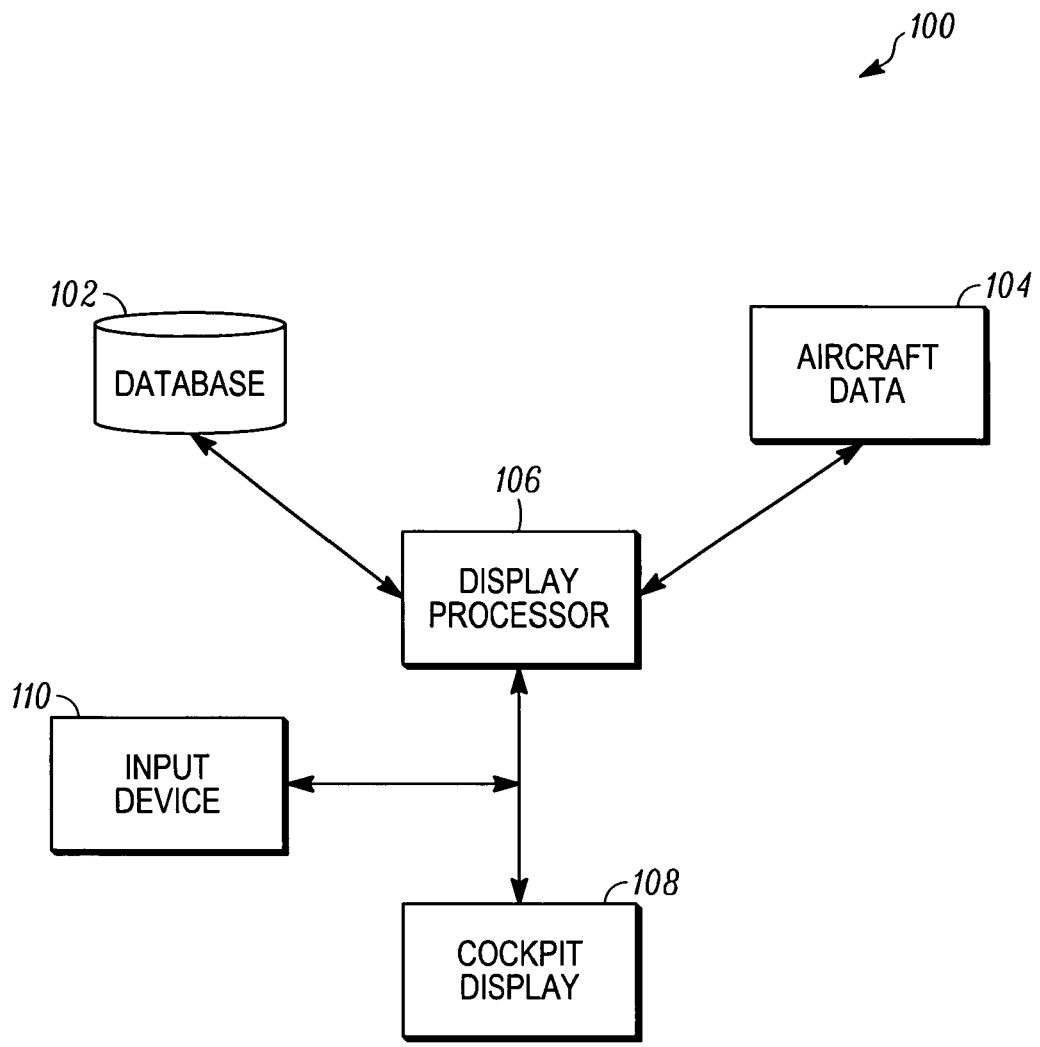
FIG. 1 is a block diagram of a system for providing runway and taxiway turning guidance, according to an example.

FIG. 1 is a block diagram of a system 100 for providing turning guidance to a pilot who is maneuvering an aircraft (sometimes referred to as the pilot's "ownship") on the ground. The aircraft may be on a runway, a taxiway, or other appropriate ground surface, such as a runway holding bay. The system 100 may include any combination of hardware, software, and/or firmware to provide the turning guidance. For example, the system 100 includes data input sources, such as a database 102 and data from the aircraft 104, a display processor 106, a cockpit display 108, and an input device 110. The system 100 may also include additional features, such as memory for storing data and executable programs.

The display processor 106 receives data from the database 102 and from the aircraft 106, and generates one or more displays to be presented on the cockpit display 108. The pilot may select the type of display or provide additional information to the display processor using the input device 110. The input device 110 may include one or more buttons or switches on the display 108 or other location within the cockpit, a microphone to receive voice instructions, and/or any other type of input device.

The database 102 may be one or more databases that can store a variety of different data types. Preferably, the database 102 includes aircraft dimensional data, aircraft turning radius data, and runway and/or taxiway dimensions (e.g., length, width, ends, and edges). The aircraft dimensional data and aircraft turning radius data may be obtained from the Federal Aviation Administration (FAA) and aircraft manufacturers. The runway and/or taxiway dimensions may be obtained from airports and Runway Awareness and Advisory System (RAAS) databases, such as Honeywell's RAAS database. The database 102 may include additional data that may be useful for generating turn guidance for the pilot.

The aircraft data 104 is generated by various avionic and/or mechanical systems on the aircraft. For example, Global Positioning System (GPS) data, ground speed data, and nose gear wheel steering angle data are available from the aircraft. The ground speed data may be obtained from an Inertial Reference System (IRS), such as Honeywell's Inertial Laser Reference System. The nose gear wheel steering angle may be available from a cockpit tiller input from the pilot. Additional data may also be available from the aircraft for generating the turning guidance.

Preferably, the display processor 106 is a computer unit that has been programmed to process data and generate a display on the cockpit display 108. The computer unit may be a commercial off-the-shelf computing device or a custom designed computing device. The display processor 106 may generate the displays described herein using techniques substantially the same as known cockpit display systems.

Based on the data received from the database 102, the aircraft 104, and the input device 110, the display processor 106 controls what is presented on the cockpit display 108. In a preferred embodiment, the cockpit display 108 is a moving map display located in the cockpit of the aircraft. However, other displays now known or developed in the future may also be used.

The moving map display includes a screen and a database of maps that depict taxiways, runways, and other terrain that the pilot is likely to encounter when maneuvering the aircraft on the ground. The map depicting the current position of the aircraft is presented on the screen. As the aircraft moves, the moving map display uses the aircraft's position to move the map on the screen accordingly. The moving map display obtains the aircraft's position from sensors on the aircraft, such as the GPS typically located on an aircraft. The moving map display allows symbology generated by the display processor 106 to be overlaid on the moving map.

Figure 2:
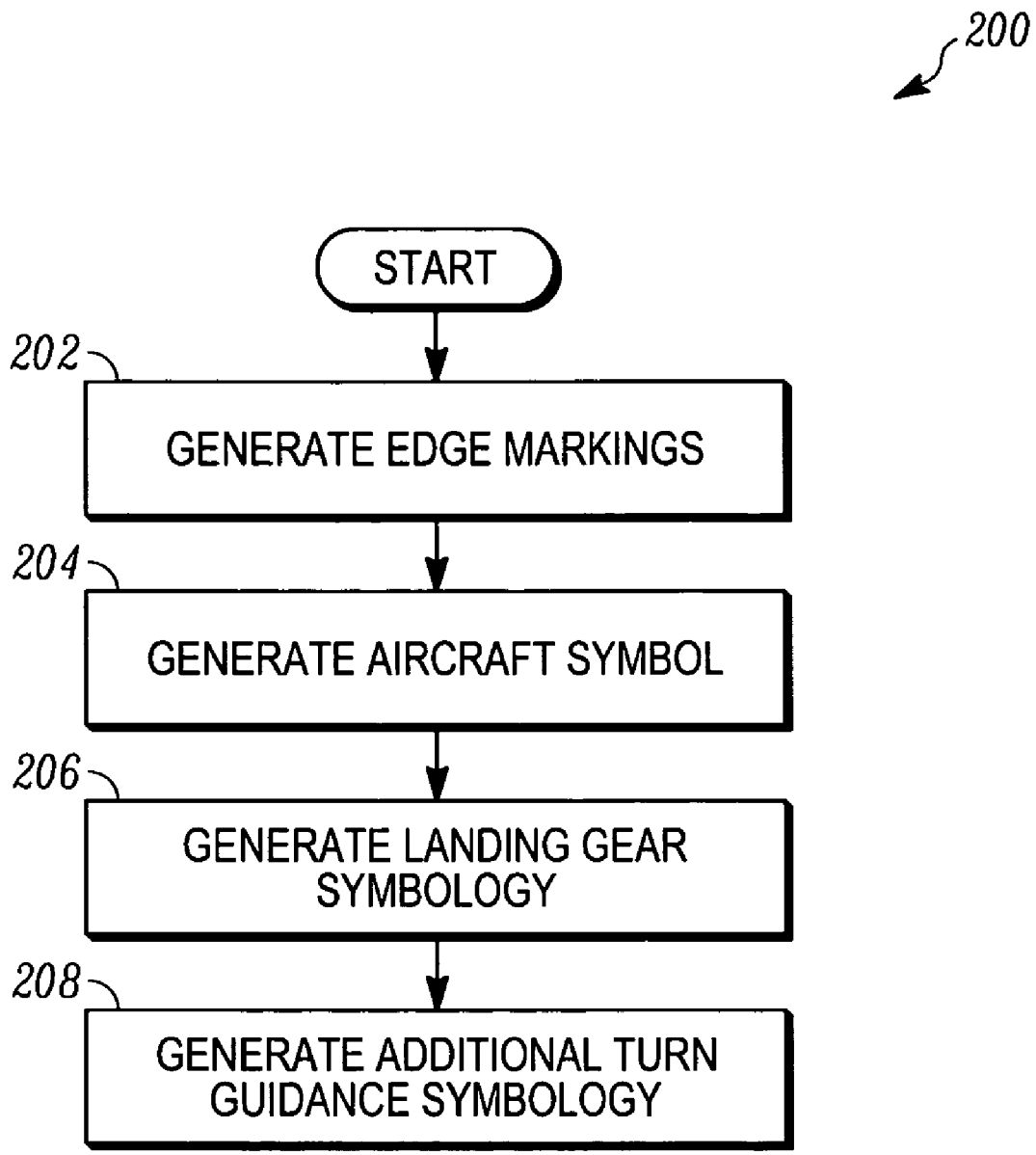
FIG. 2 is a flow chart of a method for providing runway and taxiway turning guidance, according to an example.

FIG. 2 is a flow chart of a method 200 for providing turning guidance to a pilot who is maneuvering an aircraft on the ground. The method 200 includes generating various display symbols to provide turn guidance. However, the method 200 is not limited to any particular order of generating the symbols. Additionally, not all of the symbols need to be generated at one time to provide turn guidance.

At block 202 the method 200 generates edge markings indicating a boundary between a safe surface and an unsafe surface for maneuvering the aircraft. A safe surface may be, for example, a portion of the runway that is capable of supporting the weight of the aircraft without the aircraft tires becoming stuck. An unsafe surface may be, for example, an area of the runway that is being repaired, or an area adjacent to the runway that is not capable of supporting the weight of the aircraft without the tires becoming stuck, or an area of the runway where the potential for Foreign Object Damage (FOD) is relatively high. It should be apparent that there may be many different criteria for what constitutes a safe surface and an unsafe surface, which will not necessarily be the same for all types and models of aircraft. It is contemplated that, regardless of what criteria is used to distinguish an unsafe surface from a safe one, the boundary between an unsafe surface and a safe surface may either be predefined for a particular airport, or the boundary may change in real-time based upon measured conditions outside the aircraft.

The generated edge markings are then overlaid on the moving map depicted on the cockpit display 108. The edge markings are lines or stripping located on the sides of the surface. In addition to indicating a lack of pavement, the edge markings may guide the pilot away from obstacles located on the surface, such as taxiway lighting, or from areas of the surface that are not structurally strong enough to support an aircraft.

The number of stripes depicted on the cockpit display 108 may also aid the pilot. In the examples described herein, double stripping located at each of the two edges of a surface indicates that the surface is a taxiway, while a single line denotes a runway. This configuration may match the external conditions. However, other edge marking configurations may be used.

Figure 3:
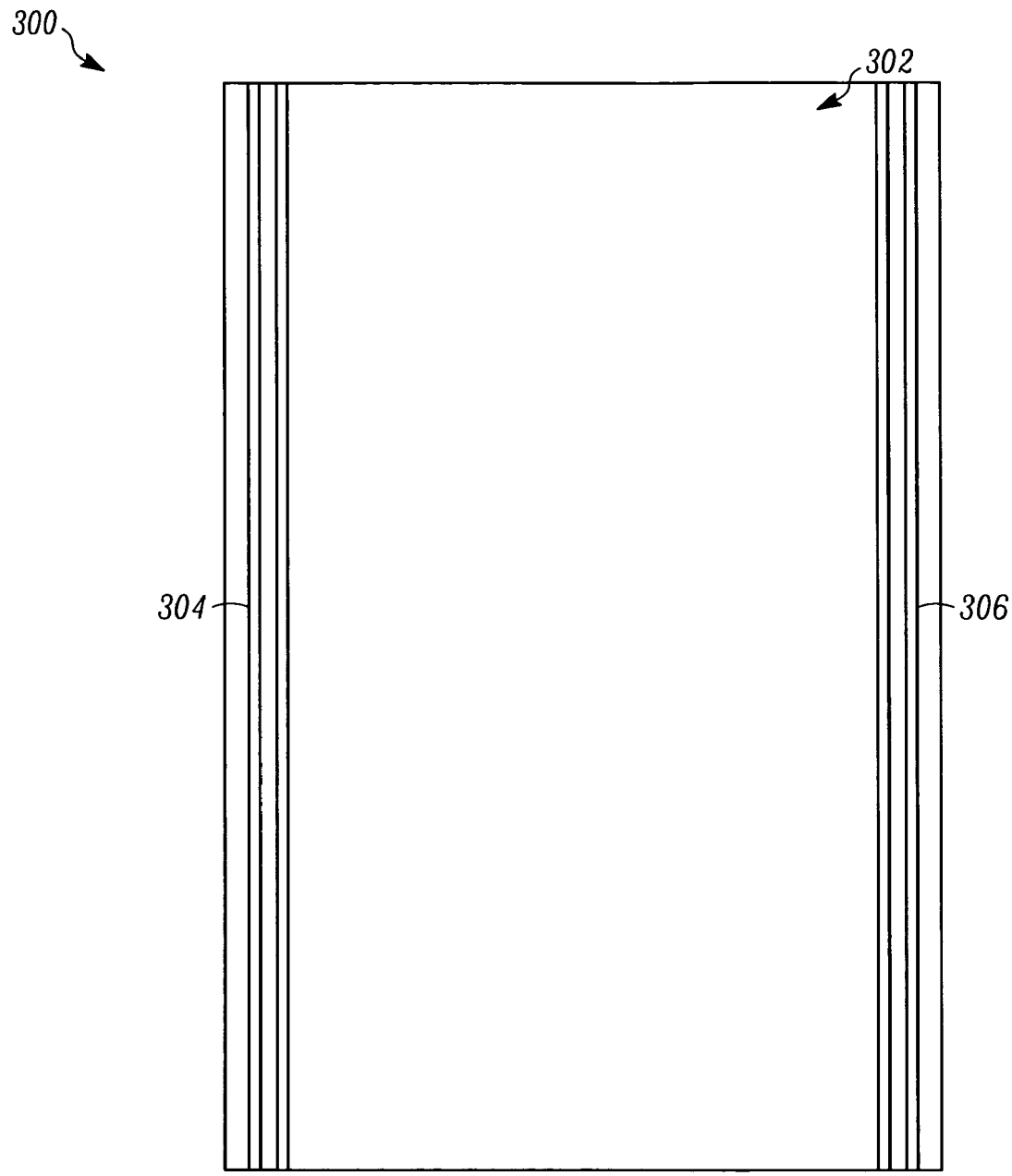
FIG. 3 is an example screenshot of a cockpit display showing taxiway edge markings.

FIG. 3 is an example screenshot 300 of a cockpit display showing taxiway edge markings 304, 306. The cockpit display 108 may present a moving map of a taxiway 302 as the pilot maneuvers the aircraft. The display processor 106 may use airport taxiway survey data to determine where to locate the edge markings 304, 306 on the moving map of the taxiway 302. The survey data may include a boundary setback as determined by the airport's taxiway setback requirements. Additionally or alternatively, the display processor 106 may use external sensors 104, such as a camera, to determine the appropriate location for the taxiway edge markings 304, 306. The display processor 106 then overlays the edge markings 304, 306 over the moving map, and presents the combined image on the cockpit display 108.

Additionally, the color of the edge markings 304, 306 may be varied to distinguish a runway from a taxiway. For example, white stripping may be used for runways, while yellow stripping may be used for taxiways. The color scheme may match the external conditions. As a result, the pilot can easily determine what type of surface on which the aircraft is being maneuvered by viewing the cockpit display 108.

Figure 4:
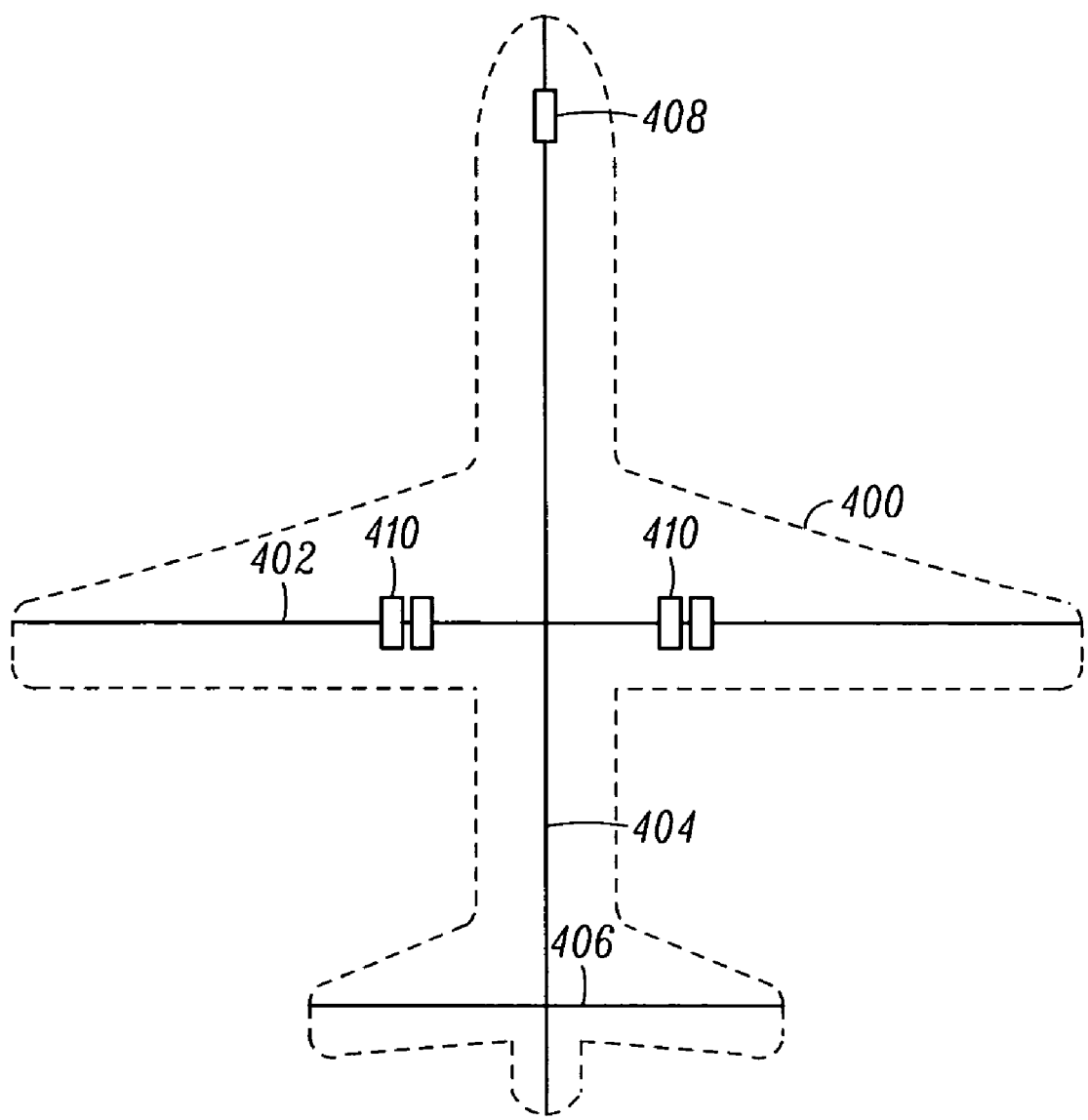
FIG. 4 is a pictorial diagram for generating aircraft symbology, according to an example.

Returning to FIG. 2, at block 204 the method 200 generates an aircraft symbol. The aircraft symbol is generated using data from the database 102, which can be better explained with reference to FIG. 4. FIG. 4 shows an outline (dashed line) of an aircraft 400. The aircraft 400 may be defined by a wing span length 402, a fuselage length 404, and a tail span length 406. FIG. 4 also depicts the location of the landing gear, which includes the nose gear 408 and the main gear 410.

The wing span length 402, the fuselage length 404, the tail span length 406, and the location of the nose gear 408 and the main gear 410 for a particular aircraft are supplied by the aircraft manufacturer and may be stored in the database 102. The display processor 106 uses the dimensions 402-406 to generate a generic aircraft symbol that is scaled in size to be proportional to the moving map representing the taxiway or runway on which the aircraft is located. An example of a generic aircraft symbol is shown in FIG. 5.

Figure 5:
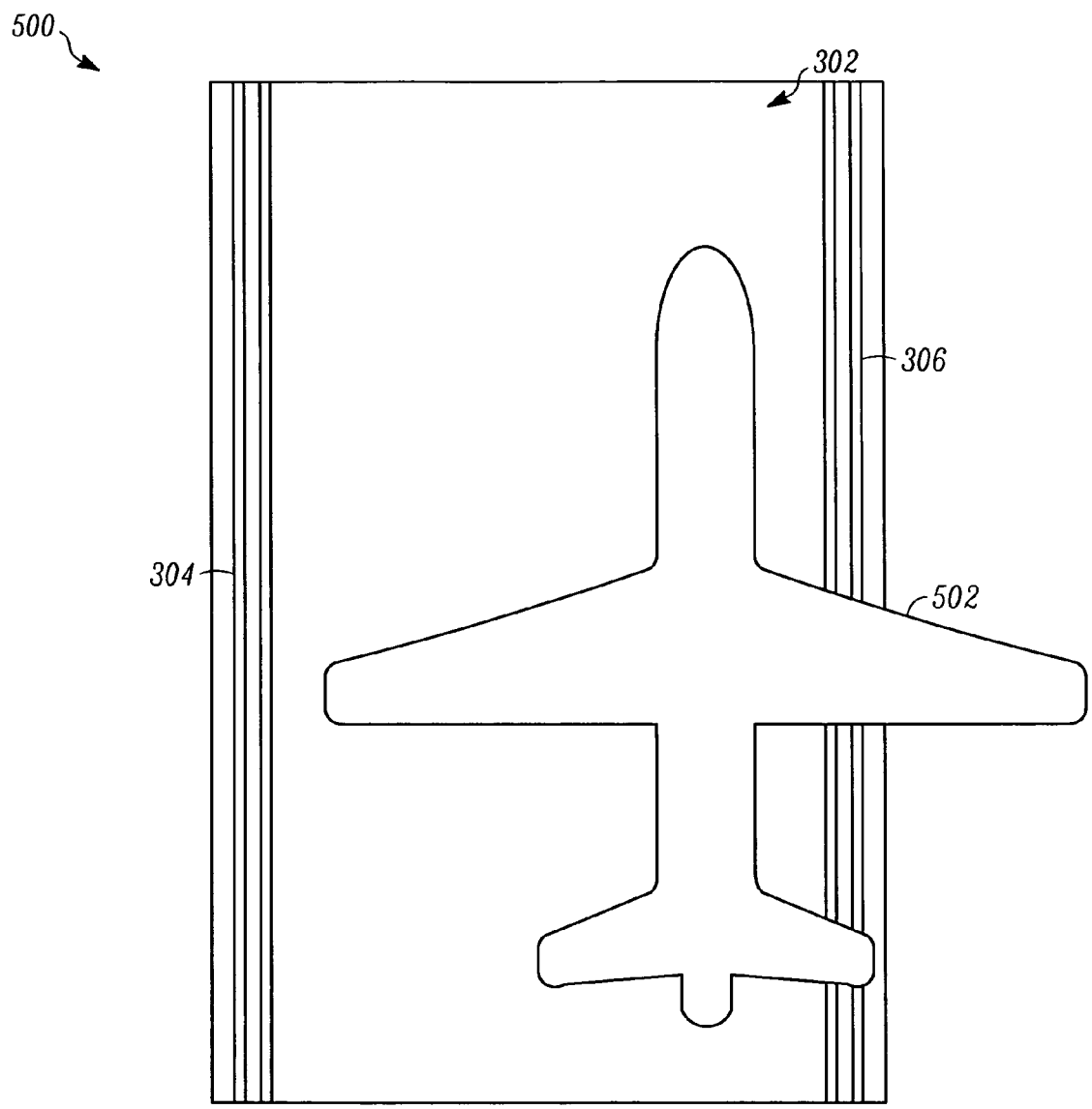
FIG. 5 is an example screenshot of a cockpit display showing aircraft symbology used in conjunction with taxiway edge markings.

FIG. 5 is an example screenshot 500 of a cockpit display showing an aircraft symbol 502 superimposed on a taxiway 302 having taxiway edge markings 304, 306. A pilot viewing the screenshot 500 can see the relationship of the aircraft symbol 502 to the edge markings 304, 306. The display processor 106 may position the aircraft symbol 502 on the moving map of the taxiway 302 using the GPS data 104.

Figure 8:
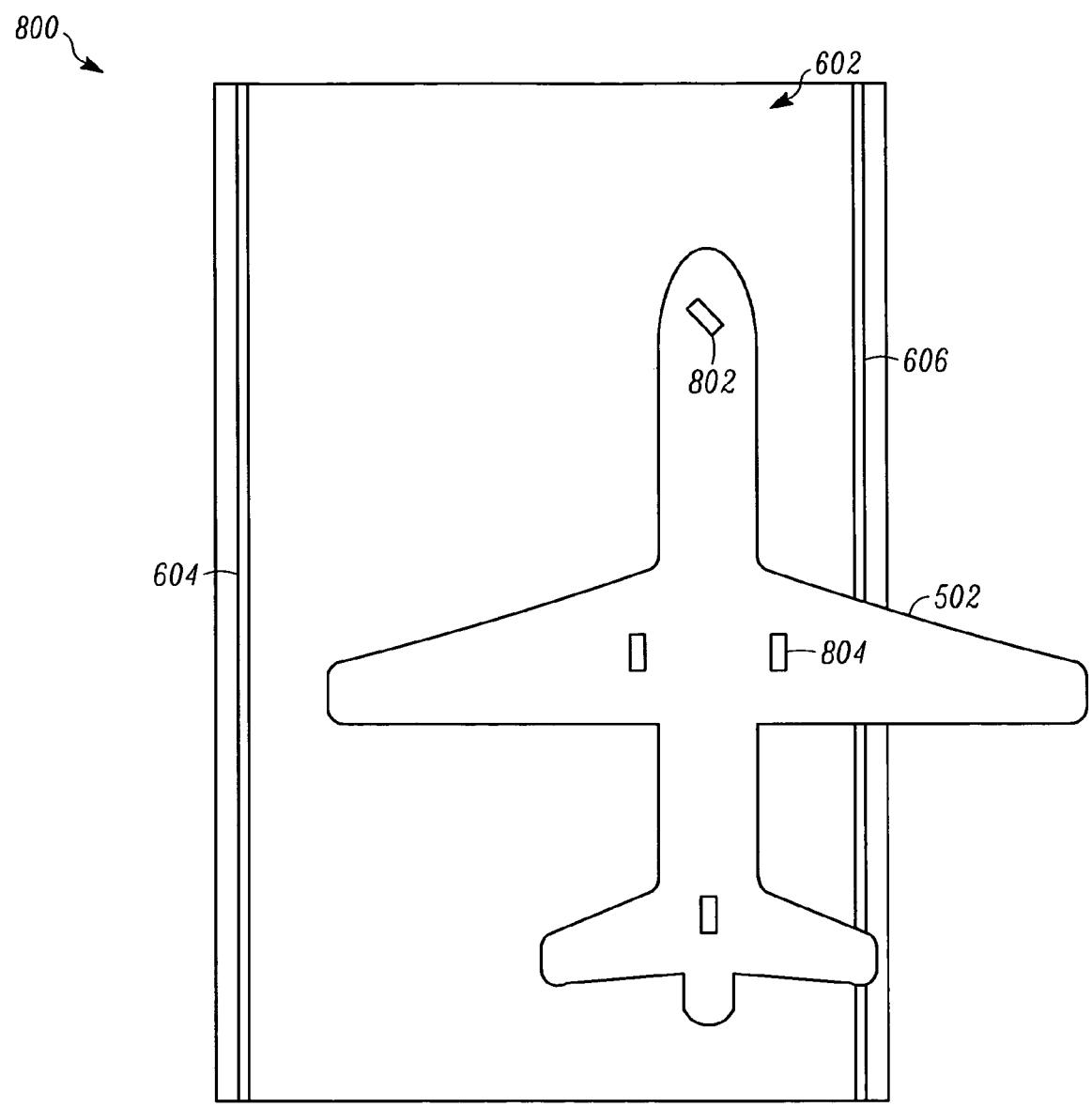
FIG. 8 is an example screenshot of a cockpit display showing aircraft symbology with a rotating nose gear.
Figure 9:
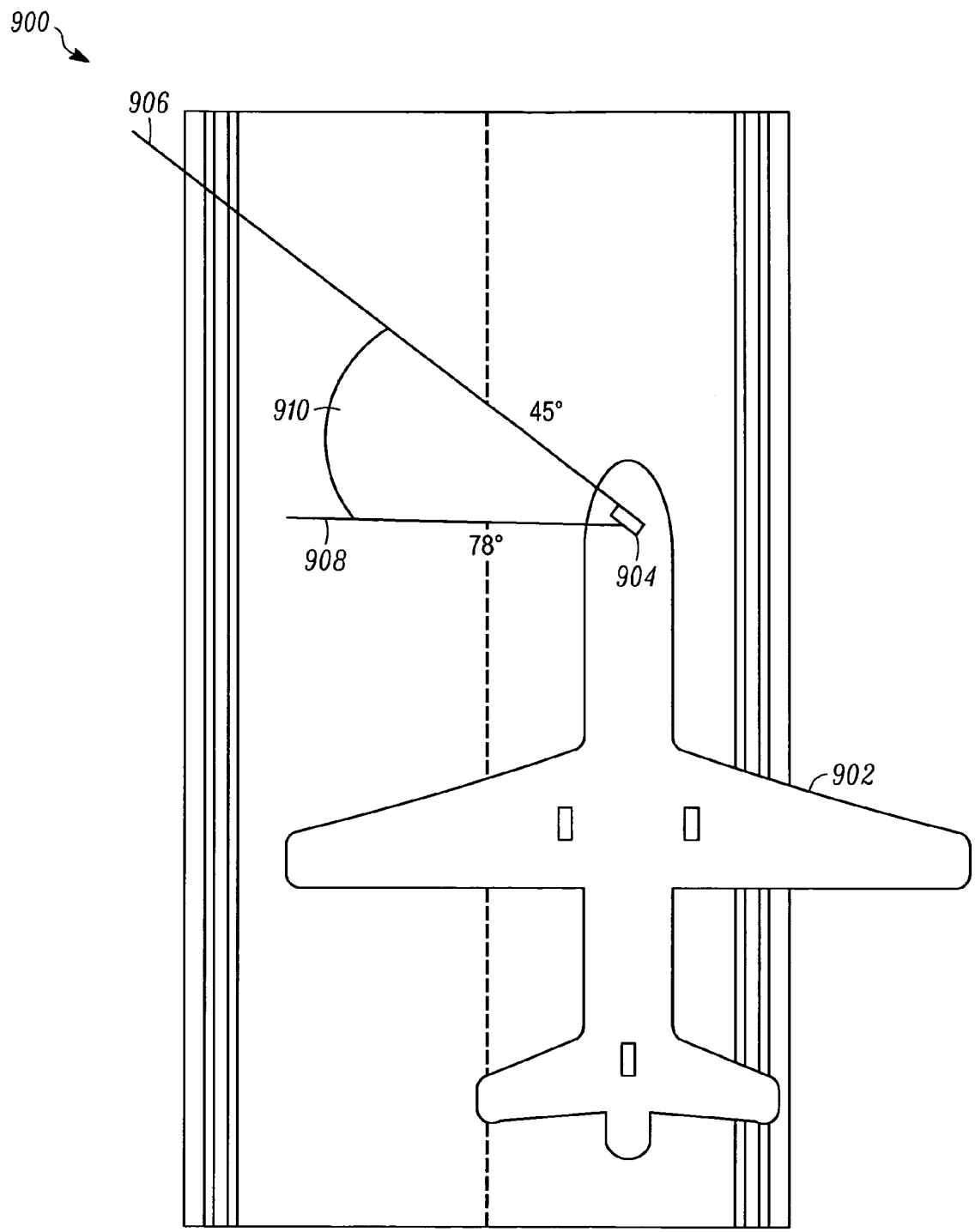
FIG. 9 is an example screenshot of a cockpit display showing a semi-transparent aircraft with turn guidance symbology.

The aircraft symbol 502 can be any recognized symbol for an aircraft and is not limited by the shape of the aircraft symbol 502 depicted in FIG. 5. Additionally, while the aircraft symbol 502 is shown in FIG. 5 as a solid color, the aircraft symbol 502 may have different designs to show additional features of the aircraft. For example, the aircraft symbol 502 may be designed to show the relationship between the surface and the landing gear as seen in FIGS. 8 and 9.

Figure 6:
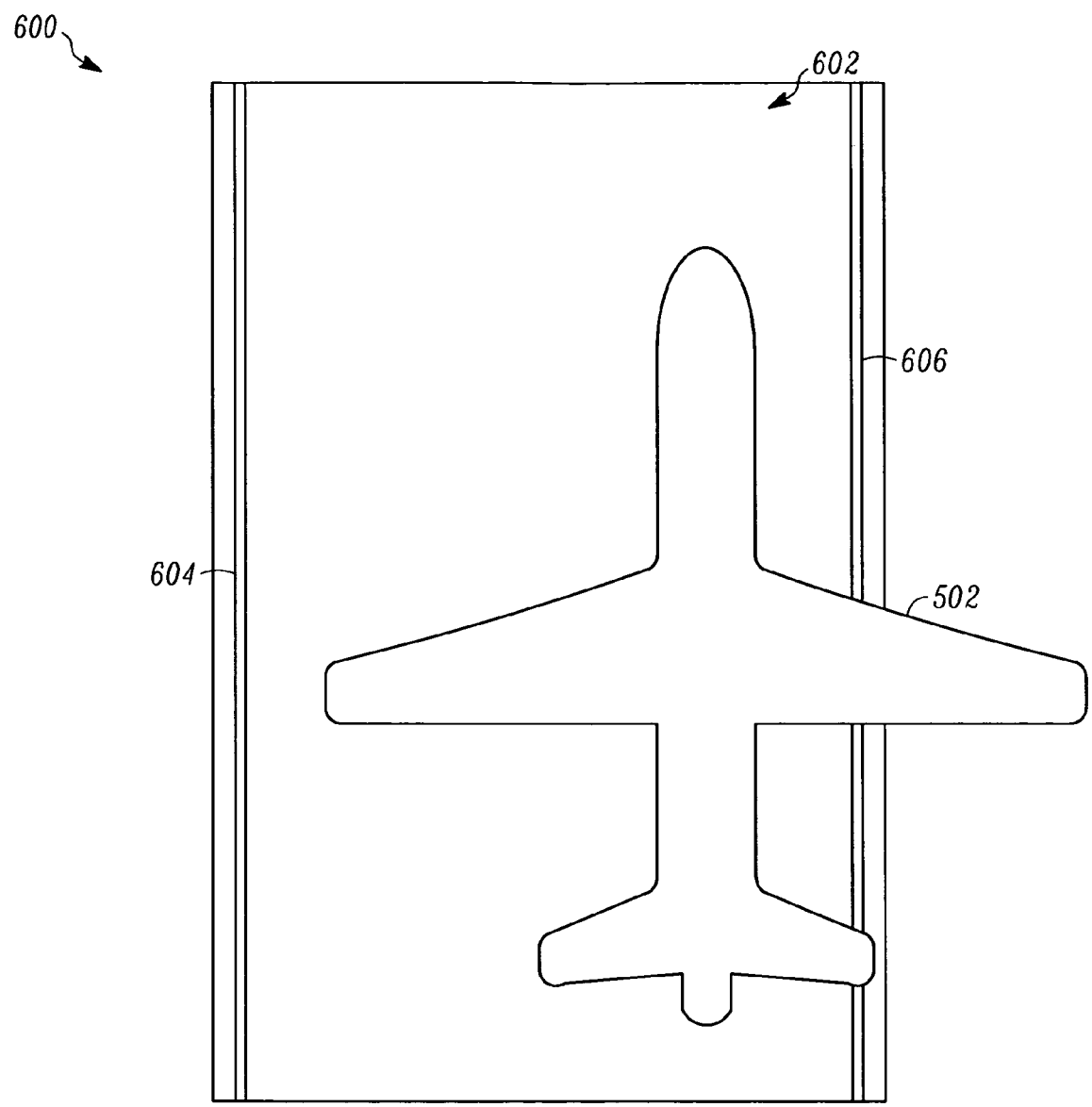
FIG. 6 is an example screenshot of a cockpit display showing aircraft symbology used in conjunction with runway edge markings.

FIG. 6 is an example screenshot 600 of a cockpit display showing the aircraft symbol 502 on a moving map of a runway 602 with runway edge markings 604, 606. As described above, the runway edge markings 604, 606 may be single line stripping located at both edges of a runway. By viewing the screenshot 600 on the cockpit display 108, the pilot can determine that the aircraft is on a runway and where the aircraft is in relationship to the runway edge markings 604, 606.

Figure 7:
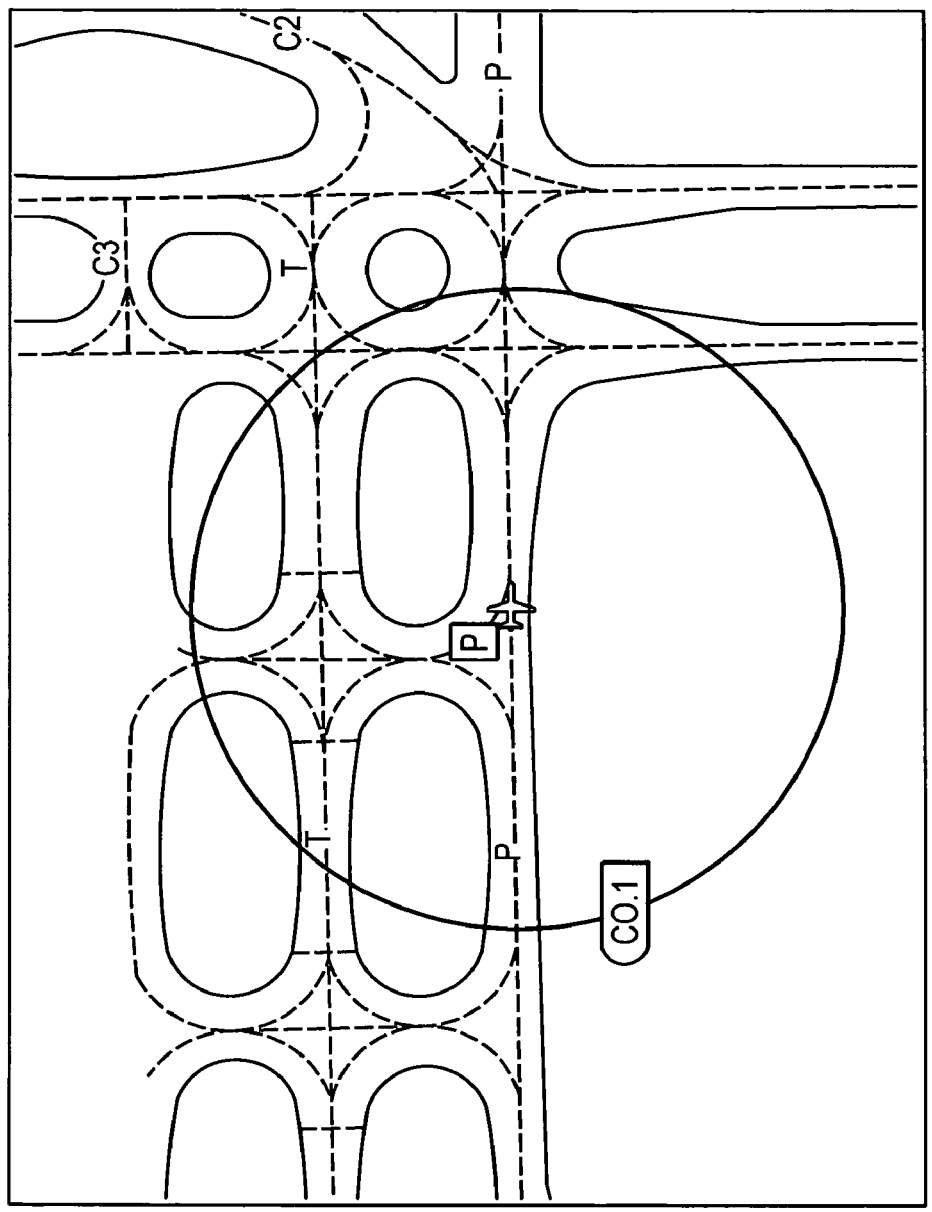
FIG. 7 is an example screenshot of a cockpit display showing aircraft symbology overlaying taxiway boundaries on a moving taxiway map.

The aircraft symbol 502 may also be overlaid on an expanded view of the moving map. FIG. 7 shows an example screenshot 700 of a cockpit display showing the aircraft symbol 502 overlaying the taxiway boundaries on a moving taxiway map. This larger perspective view may aid the pilot by allowing the pilot to see farther into the distance. The pilot may use the input device 110 to toggle between different views of the surface.

Returning to FIG. 2, at block 206, the method 200 generates landing gear symbology. As described before, the display processor 106 may obtain the position of the landing gear for a particular aircraft from the database 102. Symbology showing the location of the landing gear may be added to the aircraft symbol 502. The landing gear may be scaled to be proportional to the aircraft symbol 502.

FIG. 8 is an example screenshot 800 of a cockpit display showing the aircraft symbol 502 overlaid with nose gear 802 and main gear 804 symbology. The nose gear 802 and the main gear 804 are shown in their relative positions based on the data obtained from the database 102. Additionally, the nose gear symbol 802 may rotate to reflect the actual nose gear wheel rotation as the aircraft turns. The display processor 106 may use the nose gear steering angle input 104 to properly angle the nose gear symbol 802.

The screen shot 800 depicts the landing gear symbology 802, 804 as being alight color-overlaying a darker colored aircraft symbol 502. However, other color schemes and patterns may be used to contrast the landing gear symbology 802, 804 from the aircraft symbol 502. Another example is provided in FIG. 9 in which the landing gear symbology is a darker color overlaying a semi-transparent aircraft symbol.

Figure 10:
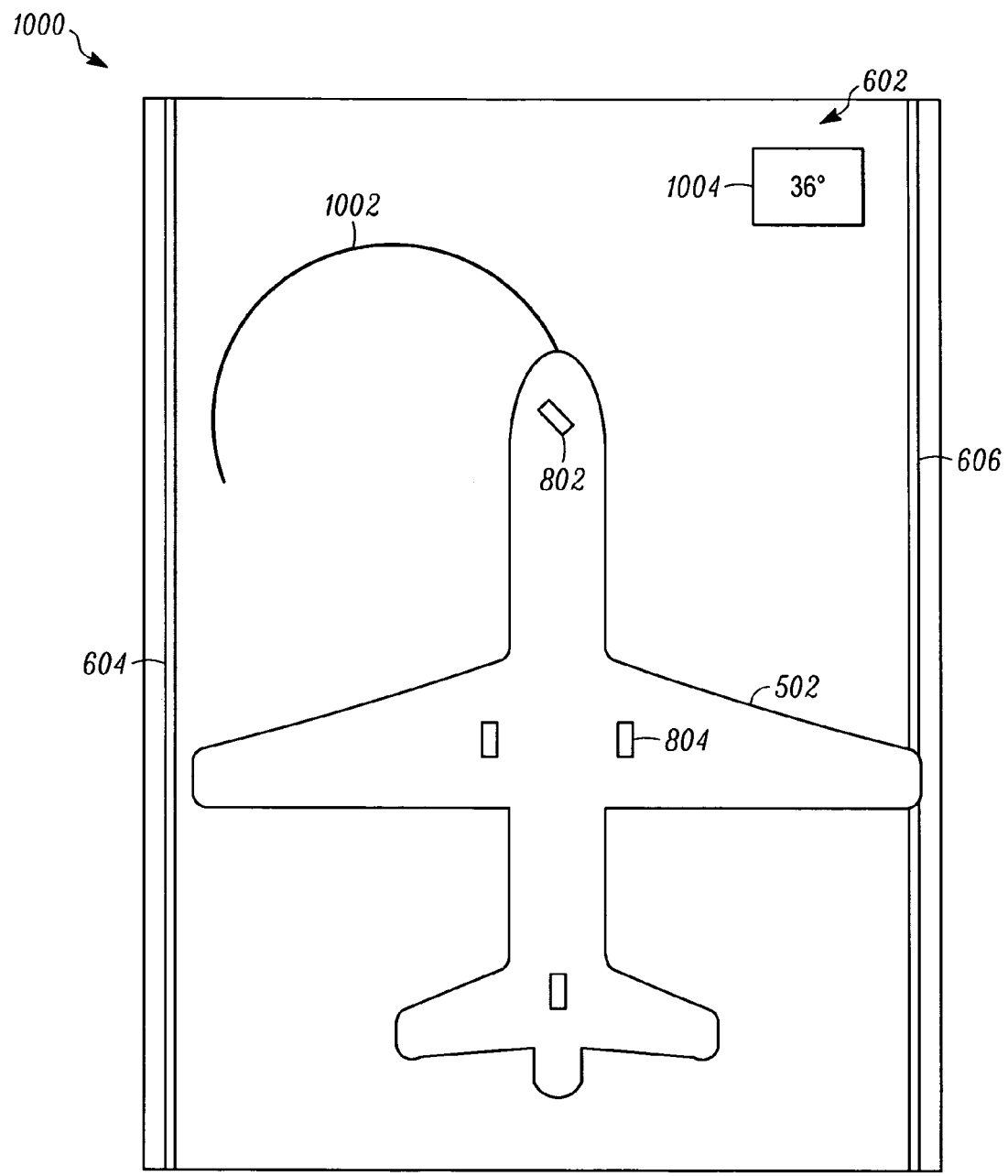
FIG. 10 is an example screenshot of a cockpit display showing a turn radius trend vector.

Returning to FIG. 2, at block 208, the method 200 generates additional turn guidance symbology. The additional turn guidance symbology may include angle lines, trend lines, current and maximum steering angles, current ground speed, and any additional information that may aid the pilot when turning the aircraft. FIGS. 9 and 10 depict some examples of additional turn guidance symbology.

FIG. 9 is an example screenshot 900 of a cockpit display showing a semi-transparent aircraft symbol 902 overlaid with darker colored landing gear symbology 904. By making the landing gear darker than the semitransparent aircraft symbol 902, the relationship between the wheels of the landing gear and the surface may be seen. The screenshot 900 also shows additional turn guidance symbology.

The additional turn guidance includes a current nose gear wheel steering angle line 906 and a maximum nose gear wheel steering angle line 908. The current nose gear wheel steering angle line 906 indicates a current nose gear wheel steering angle of 45°. Additionally, the maximum nose gear wheel steering angle line 908 indicates a maximum (i.e., full tiller) nose gear wheel steering angle of 78°. In addition to displaying the steering angle lines 906, 908, the display processor 106 may also overlay the numeric steering angles (45°, 78°) on the cockpit display as shown in FIG. 9.

The current and maximum nose gear wheel steering angles depicted in FIG. 9 are provided as a non-limiting example. In other examples, the current nose gear wheel steering angle may be zero degrees. The display processor 106 may obtain the current nose gear wheel steering angle from the cockpit tiller input from the pilot 104. Additionally, the display processor 106 may obtain the maximum nose gear wheel steering angle from the database 102. The information regarding the maximum nose gear wheel steering angle for a particular aircraft may be obtained from the aircraft manufacturer. Using this information, the display processor 106 may calculate a projected horizontal distance needed to turn the aircraft 180°.

The length of the steering angle lines 906, 908 represents the horizontal distance required to turn the aircraft 180°. As seen in FIG. 9, if the pilot attempts a 180° turn at the current steering angle of 45°, the nose gear wheel of the aircraft will leave the taxiway and potentially get stuck off the taxiway. However, by increasing the steering angle, the aircraft can turn within the taxiway width. For example, at full tiller of 78°, the pilot can turn the aircraft 180° and stay within the edge markings. The shaded area 910 between the current and maximum nose gear wheel steering angle lines 906, 908 represents the amount of nose gear wheel angle remaining. By viewing the screen shot 900, the pilot can see how much nose wheel steering angle is available and whether the pilot can successfully implement a 180° turn.

FIG. 10 is an example screenshot 1000 of a cockpit display showing a turn radius trend vector 1002. The turn radius trend vector 1002 is indicative of the projected path of the nose gear wheel at the current aircraft groundspeed and current steering angleup to the point where a 180° turn is achieved. The turn radius trend vector 1002 provides a visual guide as to whether the aircraft can make the turn within the edge markings 604, 606 as requested by the pilot. The display processor 106 obtains the current aircraft groundspeed and turning radius angle from the aircraft data 104 and calculates the turn radius trend vector 1002. The display processor then overlays the turn radius trend vector 1002 over the moving map. In this example, the pilot can turn the aircraft within the runway edge markings 602, 604.

Figure 11:
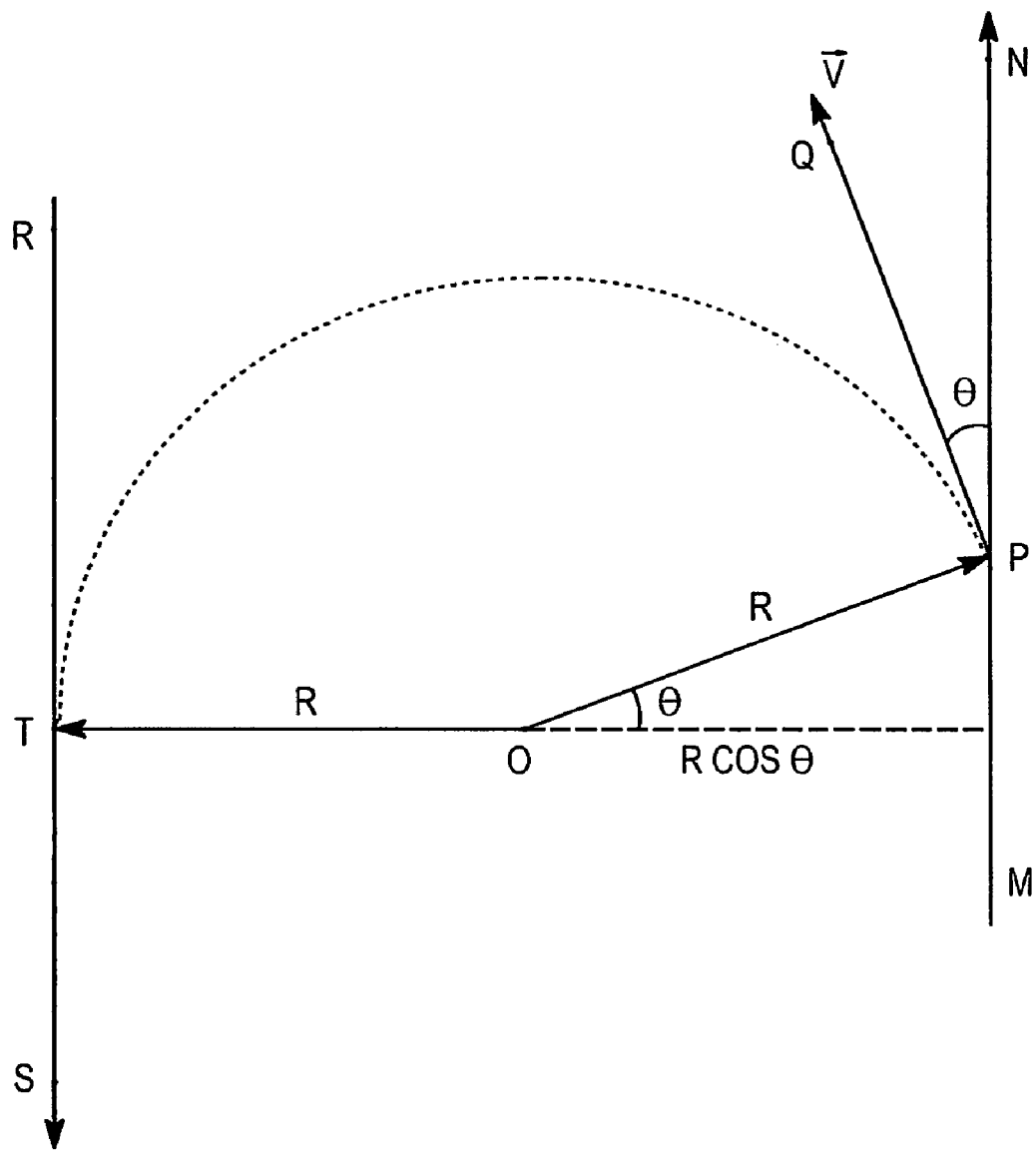
FIG. 11 is a diagram illustrating several geometric constructs that are useful in explaining how the screenshots of FIG. 9 and FIG. 10 may be obtained once the turn radius R is known.

FIG. 11 is a diagram illustrating several geometric constructs that are useful in explaining how the screenshots of FIG. 9 and FIG. 10 may be obtained once the turn radius R is known. Referring to FIG. 11, a point P along the line segment MN has a velocity V. The velocity V is, of course, a vector quantity having both a magnitude and direction. The absolute value of the magnitude of the velocity vector V is a scalar, which represents speed.

In a two-dimensional polar coordinate system, the velocity V may be decomposed into two components—a radial velocity and a transverse velocity. The radial velocity is defined as the component of velocity away from or towards the origin O, while the transverse velocity is the component of velocity along a circle of radius R that is centered at the origin O.

It is helpful to imagine that an aircraft (not shown) has a roll axis that is aligned with the line segment MN. That is, the aircraft exhibits mirror symmetry about the line MN. A nose gear wheel of the aircraft is positioned at point P. The nose gear wheel is aligned at some nose gear wheel steering angle Θ relative to the line segment MN, and has a velocity vector V. The velocity vector V is tangential to the circle of radius R centered at the origin O. The radius R of the circle is also the turn radius of the aircraft for that particular velocity V and nose gear wheel steering angle Θ.

The radial velocity of the vector V is the component of the velocity vector away from or toward the origin O. The projection of the velocity vector V on a line passing through the origin O that is also parallel to the line MN is the radial velocity component. Equivalently, the projection of the velocity vector V on the line MN is also the radial velocity, which, as can be seen in FIG. 11, is the magnitude of the velocity vector V multiplied by the cosine of Θ. The magnitude of the velocity vector (or the speed) may be obtained from GPS data, from IRS data, or from any other measurement mechanisms that characterize the speed of the aircraft relative to the ground. The nose gear wheel steering angle Θ may be obtained from the cockpit tiller input or some other means. Once calculated, the radial velocity is useful for, among other things, determining how fast the moving map display (such as the moving map displays of FIGS. 9 and 10) should be moved relative to the airplane symbol, or vice versa.

As indicated above, the transverse velocity is the component of the velocity vector V along a circle of radius R that is centered at the origin O. When the nose gear wheel at point P is not slipping, the transverse velocity may be obtained using equation 1 below.

$$V = R \times W \quad (1)$$

The turn rate W is indicative of the rate at which the heading angle is changing and may be computed from the measured heading number change. The turn rate W may be in units of, for example, degrees per second. As shown in FIG. 11, the velocity vector V is tangential to the circle of radius R centered at the origin O. Thus, the magnitude of the velocity vector V is the transverse velocity—the component of velocity along a circle of radius R that is centered at the origin O. As explained above, the magnitude of the velocity vector V (or speed) may be obtained from GPS data, from IRS data, or from any other measurement mechanisms that characterize the speed of the aircraft relative to the ground. Solving equation 1 for the turn radius R results in equation 2.

$$R = V/W \quad (2)$$

The calculated turn radius R may have a slight constant offset compared to the actual turn radius. The offset occurs because the velocity measurement is usually performed at a location that does not correspond to the wheel position. However, this offset may be calculated and accounted for. After compensating for the offset, the calculated turn radius R may be related directly to the known aircraft maximum turn radius $R_{MAX}$.

As shown in FIG. 11, the path of the nose gear wheel is along the circle of radius R centered at the origin O, or along the arc segment PT. When the nose gear wheel arrives at point T, it will be aligned along the line RS, and the roll axis of the aircraft is offset from the line RS by the nose gear wheel angle Θ. However, at this point the nose gear wheel may be steered straight down the line RS, which will eventually align the roll axis of the aircraft with the line RS.

The closest distance between the line segment MN and the line segment RS represents the perpendicular distance that the nose gear wheel is offset from line segment MN after the turn is completed, in the direction of the turn. It can be seen from FIG. 11 that once the value of R is known, the horizontal distance required for the nose gear wheel to complete a 180° turn may be calculated using equation 3.

$$\text{Distance} = R + R \cos \Theta = R(1 + \cos \Theta) \quad (3)$$

Among other things, the display processor 106 is capable of calculating the radial velocity, the transverse velocity, the turn radius, and the perpendicular offset distance using the magnitude of the velocity vector (V), the turn rate (W), and the nose gear wheel offset angle (Θ) in the manner described above. In the following paragraphs, it is explained how these calculated values may in turn be used to obtain some of the features illustrated in the screenshots 900 and 1000 of FIGS. 9 and 10.

Referring to FIG. 9, it was explained above how the lengths of the current steering angle line 906 and the maximum steering angle line 908 are representative of the horizontal distance required to turn the aircraft 180° at the current steering angle and the maximum steering angle, respectively. However, because the current steering angle line 906 and the maximum steering angle line 908 are displayed at an angle, the actual length of the lines 906, 908 should not be equivalent to the required horizontal distance that is calculated from equation 4. The reason for this may be illustrated with FIG. 11.

Referring to FIG. 11, the point T might lie just outside a boundary separating a safe surface from an unsafe surface, i.e., slightly in the unsafe area. However, if a line segment with a length specified by equation 3 was simply projected from the point P at the current tiller angle Θ, the end of the line segment might lie within the safe area, giving a false indication that the turn could be made safely.

Thus, while the length of the current steering angle line 906 and maximum steering angle line 908 are representative of the horizontal distance required to turn the aircraft 180°, according to an example embodiment the actual length of the lines 906, 908 is equivalent to the hypotenuse of a right triangle, where the vertex of the right angle is disposed on a line that passes through the point P and is perpendicular to the line MN, and is disposed at a distance away from the line MN that is given by equation 3. That is, if the roll axis of the aircraft were aligned along the line MN as illustrated in FIG. 11, the vertex of the right angle would be positioned along the line RS, perpendicular to the point P. Referring back to FIG. 9, the position of the end of the current steering angle line 906 therefore indicates that the nose gear wheel, at the completion of the turn, will lie outside the safe/unsafe boundary.

According to other example embodiments, the lengths of the steering angle lines 906 and 908 of FIG. 9 may be the same, but the safe/unsafe indication could be given by the color of the lines. For example, steering angle lines displayed using the color red may indicate that the horizontal distance calculated from equation 3 exceeds the maximum horizontal distance necessary to complete a turn, based upon the current position of the nose gear wheel. Similarly, steering angle lines displayed using the color green may indicate that the turn may be safely completed using the indicated nose gear wheel steering angle.

According to other example embodiments, the shaded area of 910 may be colored red, colored green, or individual pie-shaped regions of the shaded area 910 may be colored red and green. In the first case, the screenshot is indicative that the turn can not be safely completed either for the current steering angle or the maximum steering angle. In the second case, the screenshot is indicative that the turn may be safely completed either with the current steering angle or the maximum steering angle. In the third case, the screenshot would give a visual cue as to how much further the current steering angle must be increased to safely complete the turn. Many other ways of displaying visual cues that depend on the turn radius R (equation 2) and the calculated horizontal distance required to complete the turn (equation 4) will be apparent to those of ordinary skill.

In FIG. 10, the turn radius trend vector 1002 is a display element that is indicative of the projected path of the nose gear wheel along the runway during the turn. The projected path of the nose gear wheel along the runway is not difficult to obtain after the radial velocity, transverse velocity, and turn radius of the nose gear wheel are calculated as described above. The display processor 106 is capable of handling this task and commanding the display to output the appropriate turn radius trend vector.

Additionally, the screenshot 1000 of FIG. 10 depicts the current steering angle 1004. In alternative embodiments, the screenshot may include the current aircraft groundspeed and any other additional information that may assist the pilot when making the decision of whether to make the turn. Viewing the screenshot 1000, the pilot can easily visualize whether the aircraft can safely turn given the current ground speed and turning angle radius.

In alternative embodiments of the invention, turn radius trend vectors may also be displayed for one or more of the main gear wheels. For example, referring to FIG. 10, a turn radius trend vector may be displayed for the main gear 804 that is on the outside of the turn (the main gear on the right side of the plane), since this gear will be positioned closer to the edge of the runway at the completion of the turn. Since the main gear wheels are in a fixed position relative to the nose gear wheel, the turn radius trend vectors for the main gear wheels may easily be obtained once the turn radius trend vector 1002 for the nose gear wheel is known.

It should also be apparent that while the examples of FIG. 9 and FIG. 10 were, for illustrative purposes, directed at achieving turns of 180°, example embodiments may also be useful for determining whether turns of more than or less than 180° are achievable. For example, referring back to FIGS. 3 and 10, a pilot may wish to turn on a taxiway 302 that has edge marking 304, 306 that are arranged substantially perpendicular to the runway edge markings 604, 606. If the turn radius trend vector 1002 or other turn radius trend vectors happened to cross over the taxiway edge marking 304, 306 or runway edge markings 604, 606, the pilot could ascertain whether the aircraft could safely perform the 90° turn at the current ground speed and turn rate.

By providing turn guidance symbology on the cockpit display 108, the pilot may have the information needed to evaluate the ability of the aircraft to make the requested turn. The turn guidance symbology includes edge markings, a scaled aircraft symbol that represents the position of the aircraft with respect to the taxiway or runway, and predictive symbology that provides a visual indication of whether a particular turn can be made safely. Actual data, such as steering angle and groundspeed, may also overlay the moving map to aid the pilot. As a result, the pilot can easily visualize the aircraft's landing gear in relationship to the runway or taxiway edge and avoid getting stuck in the mud.

The invention may be practiced in many ways. What follows are example, non-limiting descriptions of some embodiments of the invention.

According to an example embodiment, a display system includes a processor adapted to receive data representative of a lateral motion of an aircraft, a forward motion of the aircraft, and a position of the aircraft, the processor operable, upon receipt of these data, to calculate a path of a wheel of the aircraft relative to a ground surface upon which the wheel is rolling. The display system further includes a display adapted to communicate with the processor, the display operable to display the path of the wheel as calculated by the processor.

According to an example embodiment, the data representative of the lateral motion, the forward motion, and the position includes a turn rate of the aircraft and a velocity of the aircraft, wherein the processor is operable to calculate a turn radius of the aircraft using the turn rate and the velocity. In an example embodiment, the turn radius is calculated by dividing the turn rate by the velocity. According to an example embodiment, the turn rate is indicative of a rate at which a heading angle of the aircraft is changing.

According to an example embodiment, the processor is further operable to correct a constant offset in the turn radius, the constant offset arising from a separation between a location of the wheel and a location where the lateral and forward motion are measured. According to an example embodiment, the processor is operable to calculate a first distance that is required for the wheel to complete a turn based upon the turn radius and the display is operable to indicate whether the first distance exceeds a limit. According to an example embodiment, the processor is operable to calculate a second distance that is required for the wheel to complete a turn based upon a maximum turn radius for the aircraft and the display is operable to indicate whether the second distance exceeds the limit.

According to another example embodiment, a method includes receiving data about an aircraft that is moving on a surface using at least a first wheel. The data is descriptive of physical characteristics of the aircraft. The method further includes calculating a first path of the first wheel along the surface using the data, and displaying the first path in relation to a boundary between a first area of the surface and a second area of the surface, the first area safe for the aircraft, the second area unsafe for the aircraft.

According to an example embodiment, displaying the first path in relation to the boundary includes displaying the first path in relation to an edge of an airport structure. The airport structure is chosen from the group consisting of an aircraft runway and an aircraft taxiway. According to an example embodiment, receiving data about the aircraft includes receiving data that is indicative of a velocity V of the aircraft and receiving data that is indicative of a turn rate W of the aircraft.

According to an example embodiment, calculating the first path includes dividing the turn rate W by the velocity V to obtain a turn radius R and calculating the first path using the turn radius R. According to an example embodiment, the method further includes calculating a distance required for the first wheel to complete a turn using the turn radius R.

According to an example embodiment, the method further includes calculating a second path of a second wheel of the aircraft along the surface, and displaying the second path in relation to the boundary. According to an example embodiment, the method further includes generating an alert when one of the first path or the second path is calculated to intercept the boundary. According to an example embodiment, generating the alert includes generating at least one selected from the group consisting of an audio alert, a visual alert, and a textual alert.

According to an example embodiment, an aircraft includes a wheel and a processor operable to calculate a path of the wheel along a ground surface when the wheel is rolling in contact with the ground surface. The aircraft further includes a display capable of communicating with the processor, the display operable to show the path of the wheel relative to a region of the ground surface.

According to an example embodiment, the processor is further operable to calculate a turn radius R of the wheel based upon a turn rate W of the aircraft and a velocity V of the aircraft. According to an example embodiment, the processor is further operable to calculate the path of the wheel using the turn radius R.

According to an example embodiment, the processor is further operable to calculate a first distance at which the wheel will complete a turn using the turn radius R. The display is further operable to show the first distance relative to the region of the ground surface.

According to an example embodiment, the processor is further operable to calculate a second distance at which the wheel will complete the turn using a maximum turn radius $R_{MAX}$. The display is further operable to show the second distance relative to the region of the ground surface.

It should be emphasized that the embodiments described above are only examples, and are not intended to limit the scope, applicability, or configuration of the invention in any way. Rather, the detailed description of the example embodiments provides those skilled in the art with a convenient road map for implementing the inventive principles contained in the example embodiments. The inventors regard the subject matter of the invention to include all combinations and subcombinations of the various elements, features, functions and/or properties disclosed herein. The claims should not be read as limited to the described order or elements unless stated to that effect. Therefore, all embodiments that come within the scope and spirit of the following claims and equivalents thereto are claimed as the invention.

The invention claimed is:

1. A display system comprising:
a processor adapted to receive data representative of a lateral motion of an aircraft, a forward motion of the aircraft, and a position of the aircraft, the data comprising a turn rate of the aircraft, and a velocity of the aircraft,
wherein the processor calculates a turn radius of the aircraft using the turn rate and the velocity, calculates a path of a wheel of the aircraft relative to a ground surface upon which the wheel is rolling, and corrects a constant offset in the turn radius, the constant offset arising from a separation between a location of the wheel and a location where the lateral and forward motion are measured; and
a display device adapted to communicate with the processor and to display the path of the wheel as calculated by the processor.

2. The display system of claim 1, the turn radius being calculated by dividing the turn rate by the velocity.

3. The display system of claim 2, wherein the turn rate is indicative of a rate at which a heading angle of the aircraft is changing.

4. A display system comprising:
a processor adapted to receive data representative of a lateral motion of an aircraft, a forward motion of the aircraft, and a position of the aircraft, the data comprising a turn rate of the aircraft, and a velocity of the aircraft,
wherein the processor calculates a turn radius of the aircraft using the turn rate and the velocity, calculates a path of a wheel of the aircraft relative to a ground surface upon which the wheel is rolling, calculates a first distance that is required for the wheel to complete a turn based upon the turn radius, and calculates a second distance that is required for the wheel to complete a turn based upon a maximum turn radius limit for the aircraft; and
a display device adapted to communicate with the processor and to display the path of the wheel as calculated by the processor, the display operable to indicate whether the second distance exceeds the maximum turn radius limit.

5. The display system of claim 4, the turn being radius calculated by dividing the turn rate by the velocity.

6. The display system of claim 5, wherein the turn rate is indicative of a rate at which a heading angle of the aircraft is changing.

7. An aircraft comprising:
a wheel;
a processor adapted to calculate a path of the wheel along a ground surface when the wheel is rolling upon the ground surface,
wherein the processor calculates a turn radius R of the wheel based upon a turn rate W of the aircraft and a velocity V of the aircraft, calculates both the path of the wheel and a first distance at which the wheel will complete a turn based on the turn radius R, and calculates a second distance at which the wheel will complete the turn using a maximum turn radius $R_{MAX}$; and
a display capable of communicating with the processor, the display rendering the path of the wheel relative to a region of the ground surface and rendering both the first distance and the second distance relative to the region of the ground surface.

* * * * *